(12) United States Patent
Liu et al.

(10) Patent No.: US 10,248,569 B2
(45) Date of Patent: Apr. 2, 2019

(54) PATTERN BASED PRELOAD ENGINE

(71) Applicant: Futurewei Technologies, Inc., Plano, TX (US)

(72) Inventors: Norris Liu, Sunnyvale, CA (US); Xingyu Jiang, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 77 days.

(21) Appl. No.: 15/234,082

(22) Filed: Aug. 11, 2016

(65) Prior Publication Data

US 2018/0046578 A1 Feb. 15, 2018

(51) Int. Cl.
*G06F 12/0862* (2016.01)
*G06F 12/1009* (2016.01)

(52) U.S. Cl.
CPC ...... *G06F 12/0862* (2013.01); *G06F 12/1009* (2013.01); *G06F 2212/1021* (2013.01); *G06F 2212/6022* (2013.01); *G06F 2212/6026* (2013.01)

(58) Field of Classification Search
None
See application file for complete search history.

(56) References Cited

U.S. PATENT DOCUMENTS

| | | | |
|---|---|---|---|
| 5,649,144 A | 7/1997 | Gostin et al. | |
| 5,721,865 A * | 2/1998 | Shintani | G06F 9/3455 711/137 |
| 2010/0268893 A1 * | 10/2010 | Luttrell | G06F 12/0862 711/137 |
| 2013/0232304 A1 | 9/2013 | Lohman et al. | |
| 2013/0267254 A1 | 10/2013 | Zhang | |
| 2013/0339650 A1 * | 12/2013 | Alexander | G06F 12/0862 711/205 |
| 2014/0149679 A1 * | 5/2014 | Rowlands | G06F 12/0862 711/137 |
| 2014/0258629 A1 * | 9/2014 | Busaba | G06F 12/0862 711/130 |
| 2017/0168946 A1 * | 6/2017 | Wang | G06F 12/0862 |
| 2017/0344482 A1 * | 11/2017 | Kumar | G06F 12/0862 |

OTHER PUBLICATIONS

"International Application No. PCT/CN2017/096789, International Search Report and Written Opinion dated Oct. 10, 2017", (dated Oct. 10, 2017), 11 pgs.

* cited by examiner

*Primary Examiner* — Mano Padmanabhan
*Assistant Examiner* — William E. Baughman
(74) *Attorney, Agent, or Firm* — Schwegman, Lundberg & Woessner, P.A.

(57) ABSTRACT

A method includes obtaining a trigger instruction responsive to execution of an application reaching a specific location and state, wherein the trigger instruction includes an index into a preload engine offset table and a base address, accessing the preload engine offset table based on the index and base address to determine an offset specific to the application location and state, and prefetching data into cache as a function of the base address and offset.

19 Claims, 11 Drawing Sheets

| FIELD | NAME | RESET | RW | DESCRIPTION |
|---|---|---|---|---|
| [63:57] | RES0 | - | WI/RAZ | RESERVED |
| [56:52] | POT INDEX | - | W/RAZ | THE INDEX OF POT TABLE |
| [51:48] | ADDRESS OFFSET | - | W/RAZ | THE ADDRESS OFFSET OF EACH ENTRY. E.G. 4'b0000: the 1st OFFSET OF THIS ENTRY 4'b1000: the 9th OFFSET OF THIS ENTRY 4'b1111: the 16th OFFSET OF THIS ENTRY |
| [47:36] | OFFSET3 | - | W/RAZ | 4th OFFSET FROM STARTING ADDRESS |
| [35:24] | OFFSET2 | - | W/RAZ | 3rd OFFSET FROM STARTING ADDRESS |
| [23:12] | OFFSET1 | - | W/RAZ | 2nd OFFSET FROM STARTING ADDRESS |
| [11:0] | OFFSET0 | - | W/RAZ | 1st OFFSET FROM STARTING ADDRESS |

FIG. 2

| PATTERN NAME | PATTERN BASE VA | STRUCT SIZE | POT LOCATION | OFFSET AMOUNT |
|---|---|---|---|---|
| struct_pattern1 | 0x40 | 32KB | 0X0 | 6 |
| struct_pattern 2 | 0x80 | 32KB | 0X6 | 12 |
| ... | | | | |

FIG. 3

| INDEX | OFF0 | OFF1 | ... | OFF15 |
|---|---|---|---|---|
| 0 | {VLD0, OFF0[9:0]} | {VLD1, OFF1[9:0]} | ... | {VLD15, OFF15[9:0]} |
| 1 | {VLD0, OFF0[9:0]} | {VLD1, OFF1[9:0]} | ... | {VLD15, OFF15[9:0]} |
| 2 | {VLD0, OFF0[9:0]} | {VLD1, OFF1[9:0]} | ... | {VLD15, OFF15[9:0]} |
| ... | | | | |
| 45 | {VLD0, OFF0[9:0]} | {VLD1, OFF1[9:0]} | ... | {VLD15, OFF15[9:0]} |

| FIELD | NAME | DESCRIPTION |
|---|---|---|
| [11] | VALID BIT | IF NOT 1'b1, THE PLE WILL SKIP THIS OFFSET |
| [10] | SIGN BIT | IF 1'b1, THE OFFSET IS NEGATIVE AND IN 2'S COMPLEMENTARY FORM |
| [9:0] | OFFSET | SIGN EXTENDED OFFSET WITH CACHELINE GRANULE. WITH SIGN BIT, IT COVERS +/- 64kb BUT NOT INCLUDE - 64KB |

| FIELD | NAME | RESET | RW | DESCRIPTION |
|---|---|---|---|---|
| [63:57] | RES0 | - | WI/RAZ | RESERVED |
| [56:52] | POT INDEX | - | W/RAZ | THE INDEX OF POT TABLE |
| [51:48] | ADDRESS OFFSET | - | W/RAZ | THE ADDRESS OFFSET OF EACH ENTRY.<br>E.G. 4'b0000: the 1st OFFSET OF THIS ENTRY<br>4'b1000: the 9th OFFSET OF THIS ENTRY<br>4'b1111: the 16th OFFSET OF THIS ENTRY |
| [47:36] | OFFSET3 | - | W/RAZ | 4th OFFSET FROM STARTING ADDRESS |
| [35:24] | OFFSET2 | - | W/RAZ | 3rd OFFSET FROM STARTING ADDRESS |
| [23:12] | OFFSET1 | - | W/RAZ | 2nd OFFSET FROM STARTING ADDRESS |
| [11:0] | OFFSET0 | - | W/RAZ | 1st OFFSET FROM STARTING ADDRESS |

FIG. 5

| FIELD | NAME | RESET | RW | DESCRIPTION |
|---|---|---|---|---|
| [63:63] | ACTIVE | 1'b0 | RW | 1'b1: PLE IS ACTIVE; 1'b0: PLE IS IDLE. THIS CAN BE SET BY MSR OR UPDATE BY THE HARDWARE. |
| [62:61] | PLE MODE | - | W/RAZ | 2'b00: PLE_S_L1, D-SIDE PREFETCH FOR READ TO L1<br>2'b01: PLE_S_L2, D-SIDE PREFETCH FOR READ TO L2<br>2'b10: PLE_M_L1, D-SIDE PREFETCH FOR STORE TO L1<br>2'b11: PLE_M_L2, D-SIDE PREFETCH FOR STORE TO L2 |
| [60:51] | POT STARTING ADDRESS | - | W/RAZ | THE STARTING LOCATION OF POT FOR PBPL.<br>[60:55] POT INDEX. LEGAL RANGE: 0x0~0x2E<br>[54:51] OFFSET WITHIN THE POT INDEX |
| [50:44] | PREFETCH AMOUNT | - | W/RAZ | THE NUMBER OF PREFETCHES TO BE TRIGGERED BY PLE USED BY BOTH SBPL AND PBPL. MAXIMUM: 128 PREFETCHES PER PLE INSTRUCTION. |
| [43:1] | VA BASE | - | W/RAZ | COMPUTED VA[48:6] USED BY BPL |
| [0:0] | RES0 | - | W/RAZ | RESERVED |

FIG. 6

| POT FSM FIELD | RESET | DESCRIPTION |
|---|---|---|
| STATE [1:0] | INVALID | POT STATE MACHINE STATE<br>0: INVALID - NO POT READ NEEDED<br>1: RESERVED<br>2: PENDING - THE PREVIOUS READ HAS NOT SENT ALL PLE PLD OPS<br>3: READY - READY TO SCHEDULE THE NEXT POT READ<br>MRS TO PLSR HITTING PENDING/READY WILL RETURN 1 IN BIT[63] |
| Cnt [3:0] | 4'b0 | PENDING READ COUNTER. THE REMAINING READ NEEDED. |
| NXT_IDX [4:0] | - | NEXT INDEX OF POT TO READ |

FIG. 7

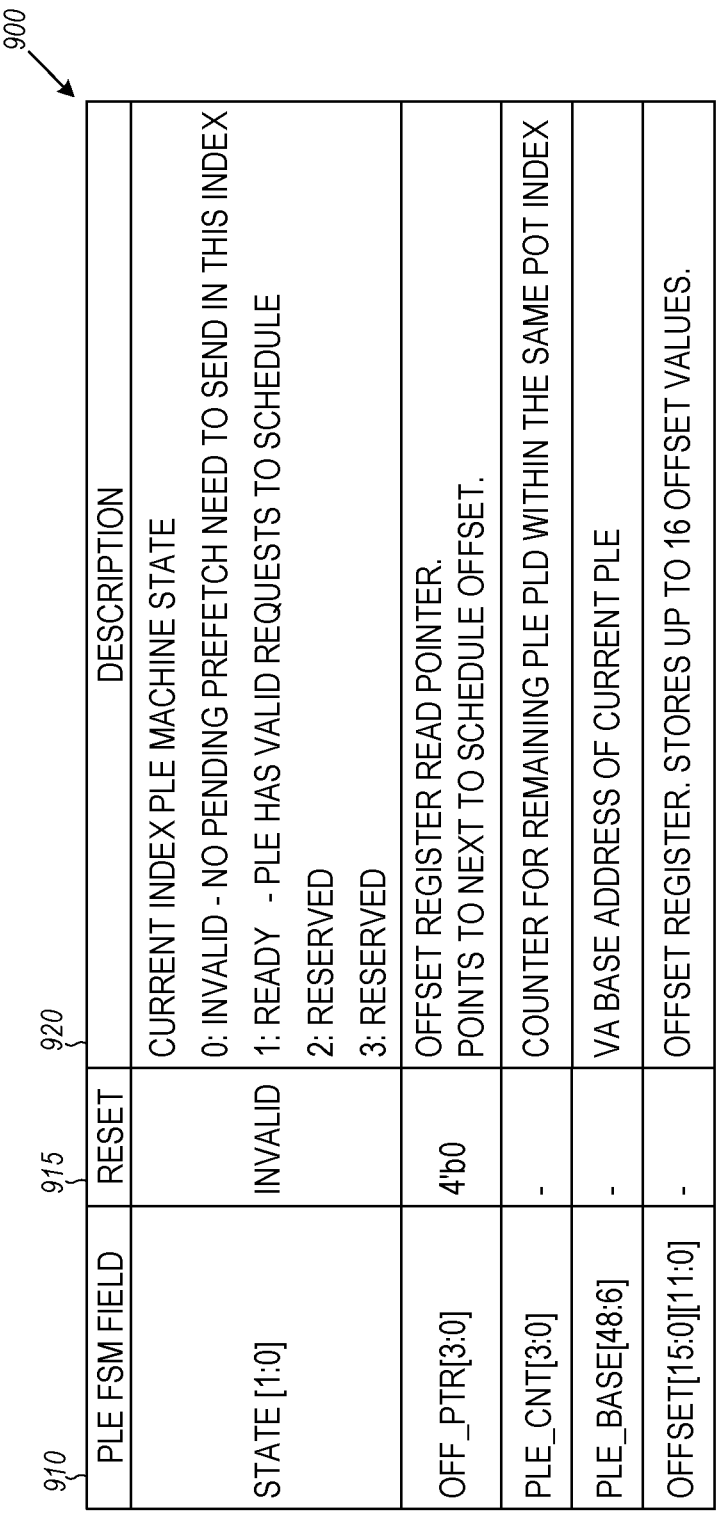

FIG. 9

| PLE FSM FIELD | RESET | DESCRIPTION |
|---|---|---|
| STATE [1:0] | INVALID | CURRENT INDEX PLE MACHINE STATE<br>0: INVALID - NO PENDING PREFETCH NEED TO SEND IN THIS INDEX<br>1: READY - PLE HAS VALID REQUESTS TO SCHEDULE<br>2: RESERVED<br>3: RESERVED |
| OFF_PTR[3:0] | 4'b0 | OFFSET REGISTER READ POINTER. POINTS TO NEXT TO SCHEDULE OFFSET. |
| PLE_CNT[3:0] | - | COUNTER FOR REMAINING PLE PLD WITHIN THE SAME POT INDEX |
| PLE_BASE[48:6] | - | VA BASE ADDRESS OF CURRENT PLE |
| OFFSET[15:0][11:0] | - | OFFSET REGISTER. STORES UP TO 16 OFFSET VALUES. |

PATTERN BASED PRELOAD ENGINE

FIELD OF THE INVENTION

The present disclosure is related to prefetching data for cache memory and in particular to a pattern based preload engine to prefetch data for cache memory based on access patterns of applications.

BACKGROUND

Cache memory is memory configured to provide data to one or more processors very quickly. Data stored in the cache memory can be accessed more quickly but is more expensive than slower memory. Accordingly, it is generally limited in size and is typically reserved for storing data that is most likely to be needed by the one or more processors during execution of a program. The selection of data for the cache generally relies on data having some form of locality. In other words, data likely to be needed next in execution of a program is stored near data just used. By populating the cache with data stored nearby recently used data, that data is more likely to be needed. Further access patterns may exhibit temporal locality. In other words, data that was just used, may be soon needed again.

Traditional hardware prefetchers suffer from prefetch redundancy and prefetch insertion timing problems. Typical software based preload instructions can only preload one cacheline per instruction. In order to calculate the address of the cacheline, such software requires more load/store and ALU instructions, which severely diminish the benefit of such preloads. Some implementations do have a preload engine which targets a specific address pattern which may hardly benefit real world cases.

SUMMARY

A method includes obtaining a trigger instruction responsive to execution of an application reaching a specific location and state, wherein the trigger instruction includes an index into a preload engine offset table and a base address, accessing the preload engine offset table based on the index and base address to determine an offset specific to the application location and state, and prefetching data into cache as a function of the base address and offset.

Various examples are now described to introduce a selection of concepts in a simplified form that are further described below in the detailed description. The Summary is not intended to identify key or essential features of the claimed subject matter, nor is it intended to be used to limit the scope of the claimed subject matter.

In example 1, a method includes obtaining a trigger instruction responsive to execution of an application reaching a specific location and state, wherein the trigger instruction includes an index into a preload engine offset table and a base address, accessing the preload engine offset table based on the index and base address to determine an offset specific to the application location and state, and prefetching data into cache as a function of the base address and offset.

Obtaining a program location and state of a program being executed by a processor, identifying a pattern corresponding to the program location and state of the program, accessing a software defined pattern table to determine a base address of a bulk preload and an offset from a preload engine offset table as a function of the pattern, and prefetching data into cache as a function of the base address and offset.

Example 2 includes the method of example 1 and further including providing the base address and offset to the preload engine.

Example 3 includes the method of example 2 wherein the base address and offset are combined to form a virtual address of the data.

Example 4 includes the method of example 3 and further includes translating the virtual address of the data to a physical address.

Example 5 includes the method of example 4 and further includes providing the physical address to a preload pending buffer.

Example 6 includes the method of example 5 and further includes providing the physical address from the preload pending buffer to a memory subsystem to prefetch the data into the cache.

Example 7 includes the method of any of examples 1-6 wherein the preload engine offset table comprises a finite state machine having states of invalid, pending, and ready.

Example 8 includes the method of example 7 wherein the pending state corresponds to operations for a prefetch not having been completed.

Example 9 includes the method of example 8 wherein the ready state corresponds to the operations for the prefetch having been completed and being ready for another prefetch.

In example 10, a device includes a preload offset table containing base addresses and offsets corresponding to access patterns of applications, an adder coupled to the preload offset table to add a selected base address and offset to form a virtual address of data to be prefetched to a cache, a virtual address translator coupled to translate the virtual address to a physical address, and a preload pending buffer coupled to receive the physical address and provide the physical address to a memory to provide the data to the cache.

Example 11 includes the device of example 10 wherein the preload offset table further provides multiple offsets for each base address corresponding to access patterns of the applications.

Example 12 includes the device of example 11 and further includes a same page detector coupled to receive the virtual address from the adder, the same page detector being operable to bypass the virtual address translator responsive to a same page as previously translated having been received.

Example 13 includes the device of example 12 and further includes a local translator coupled to receive the same page virtual address and translate it directly for provision to the preload pending buffer, bypassing the virtual address translator.

Example 14 includes the device of any of examples 10-13 and further includes registers coupled to the preload offset table to provide program location and state of a program being executed by a processor to index into the preload offset table at a corresponding pattern.

Example 15 includes the device of any of examples 10-14 wherein the preload engine offset table comprises a finite state machine having states of invalid, pending, and ready.

Example 16 includes the device of example 15 wherein the pending state corresponds to operations for a prefetch not having been completed and wherein the ready state corresponds to the operations for the prefetch having been completed and being ready for another prefetch.

In Example 17, a system includes a pattern table coupled to provide a base address of a bulk preload as a function of a specific program location and state, a preload offset table indexed via the pattern table to provide multiple offsets corresponding to access patterns associated with the specific program location and state, a preload engine coupled to access the pattern table and preload offset table, derive a virtual address from the base address and offset, and provide a translation of the virtual address to a physical address, a preload pending buffer coupled to receive the physical address from the preload engine, a cache to receive data located at the physical address, and one or more processing units coupled to access the cache.

Example 18 includes the system of example 17 wherein the preload offset table comprises entries containing at least 16 offsets.

Example 19 includes the system of any of examples 17-18 wherein the pattern table base address includes a pattern base address, a structure size, and a user ID.

Example 20 includes the system of any of examples 17-19 wherein the preload engine comprises a preload start register to receive a command and information sufficient to trigger a bulk preload, including a preload offset table starting address, prefetch amount, and a virtual base address.

BRIEF DESCRIPTION OF THE DRAWINGS

FIG. 2 is representation of a pattern table to provide base addresses corresponding to patterns according to an example embodiment.

FIG. 3 is a representation of a preload offset table to provide offsets to data to be prefetched corresponding to the access patterns according to an example embodiment.

FIG. 5 is a table representing an offset register according to an example embodiment.

FIG. 6 is a table showing information associated with specific bits of the preload engine start register according to an example embodiment.

FIG. 7 is a table illustrating the states of the preload offset table finite state machine according to an example embodiment.

FIG. 9 is a table describing states of a preload engine finite state machine according to an example embodiment.

DETAILED DESCRIPTION

Figure 1A:
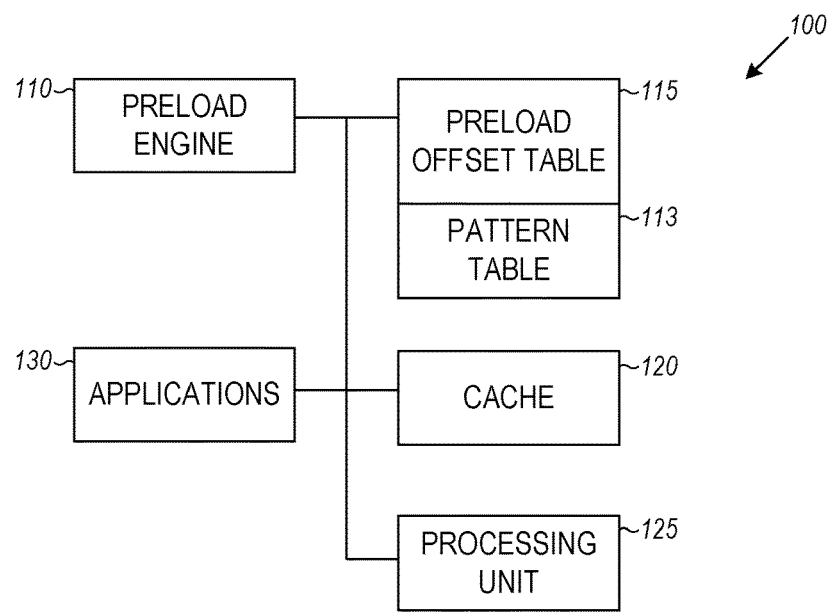
FIG. 1A is a block diagram of a system for prefetching data for cache based on access patterns of applications according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Execution of a typical application where static memory allocation is heavily used may result in iteration through a list of data structures. The addresses of the data iterated through may be pre-determined early in a setup phase of the application and varies from application to application. The memory footprint of the data structures may be large and thus introduces significant capacity miss in both low level caches. Each function provided by the application may visit different fields of each data structure. The fields being visited may be scattered around in the data structure and the strides between two recently visited fields can sometimes be large. The scattered nature and strides between recently visited fields can introduce significant difficulties in prior prefetch mechanisms that rely on physical and temporal locality, resulting in significant cache misses and extra prefetches.

A system level solution improves cache hit rate in a microprocessor so that the processor performance can be improved. The solution is suitable for various system architectures, including server processors and communication processors. In various embodiments, a software defined preload engine is used to define a table of patterns of data access by programs executing on a processor. When an application is written, the patterns may be derived by looking at the access patterns that occur during execution of the application. Each application may have access patterns that can be quite different from another application.

Each pattern contains a list of offsets into data structures. Then software triggers the preload engine with a given base address and a pattern ID. The preload engine (PLE) will calculate the virtual address using the provided base address and the offset from a preload engine offset table and generate Bulk Preloads (BPL) to bring the predicted cacheline into cache memory.

One or more advantages may be provided, including a reduction of hardware detection logic which is both costly and sometimes in-accurate. The number of load/store and ALU instructions to preload each cacheline may also be reduced. A large number of prefetch requests are not needed for each single instruction. Software may be used to provide fine control of the timing to insert the prefetches. A high performance interface may be provided for preload triggering and prefetch table programming. Random patterns are supported as well as ability to program and reprogram the pattern table.

FIG. 1A is a block diagram of a computer system 100 that utilizes a preload engine (PLE) 110, pattern table (PTB) 113, and preload offset table (POT) 115 to prefetch data for a cache 120. The cache 120 makes the prefetched data available for a processing unit 125 to use for execution of software, including applications 130.

When the software that is executing on the processing unit 125 reaches a specific program location and state, it causes a lookup in the pattern table 113 to obtain information from which a base address of a bulk preload (BPL) may be calculated. A write to a preload start register (PLSR) register will trigger the look up. The data inside the write instruction provides the index of POT.

Figure 1B:
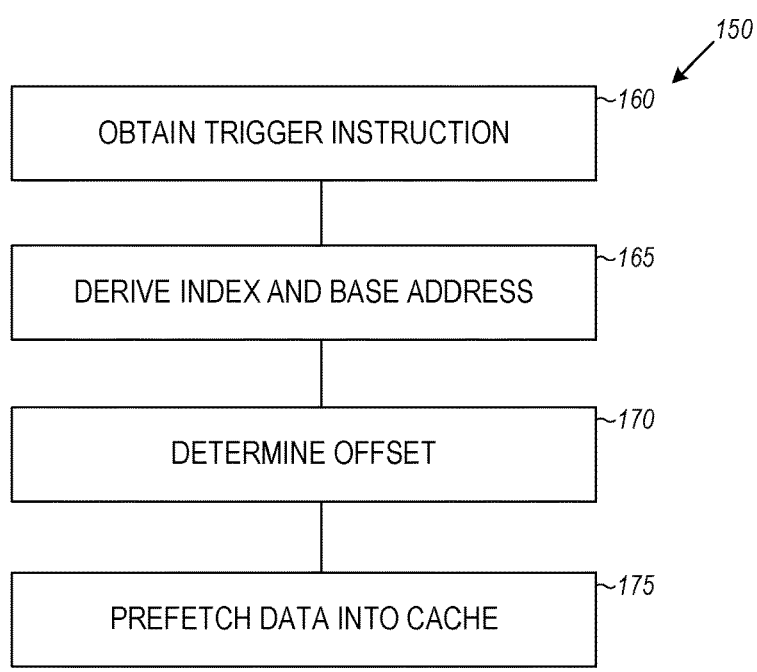
FIG. 1B is a flowchart illustrating a method of prefetching data based on access patterns according to an example embodiment.

FIG. 1B is a flowchart illustrating a method 150 of prefetching data based on access patterns according to an example embodiment. At 160, a state and location of an executing program, such as an application being executed by the processing unit is obtained and triggers the write instruction. At 165, an index to the POT 115 is derived along with a base address. The POT 115 is used to determine an offset, which together with the base address is combined to obtain a virtual address at 170. Using the preload engine offset table provides the ability to tailor fetches specific to a current location and state of an executing application. The base address in one embodiment is provided by specific bits [43:1] of a software instruction loaded into the PLSR as described below in FIG. 6. At 175, data identified by a combination of the base address and offset forming the virtual address, is fetched into cache.

In one embodiment, the base address and offset are added to form a virtual address of the data, which is then translated by the TLB (translation lookaside buffer) to a physical address. The physical address may then be provided to a preload pending buffer for using to prefetch data from a memory subsystem into the cache.

The pattern table is maintained by software and is shown in further detail at 200 in FIG. 2, and may include a pattern name 210, pattern base virtual address (VA) 215, structure size 220, POT location 225, and offset amount 230. When there are multiple structures, a base address of the bulk preload may be defined as: PATTERN_BASE+ USER_STRUCT_SIZE*USER_ID. The PATTERN_BASEs and USER_STRUCT_SIZEs are known in the early phases of the application generation, so the pattern table may be initialized very early and mostly stay unchanged throughout an application run time.

In one embodiment, software may utilize cacheline keep instructions if data temporal locality is desired. This may be done by inserting PLD_L1KEEP instructions into the application. Fields statically decided, such as STRUCT_SIZE, POT Location, Offset Amount may be defined as constant in the application.

In one embodiment, the pattern table may be maintained to link a pattern to a specific application. Since the application exhibits known access patterns that may be derived from code written to create the application, the use of a software defined preload engine that utilizes the pattern table, can significantly increase cache hit ratios and lead to more efficient execution of applications.

Once the pattern table has been used to find the base virtual address and offset amount, the preload offset table, as shown in further detail at 300 in FIG. 3, may be used to identify the location of the data to be preloaded, referred to as a bulk preload. In one embodiment, a software view of the preload offset table includes an index 310, an offset 0 at 315, offset 1 at 320, etc., to offset 15 at 325.

Figure 4:
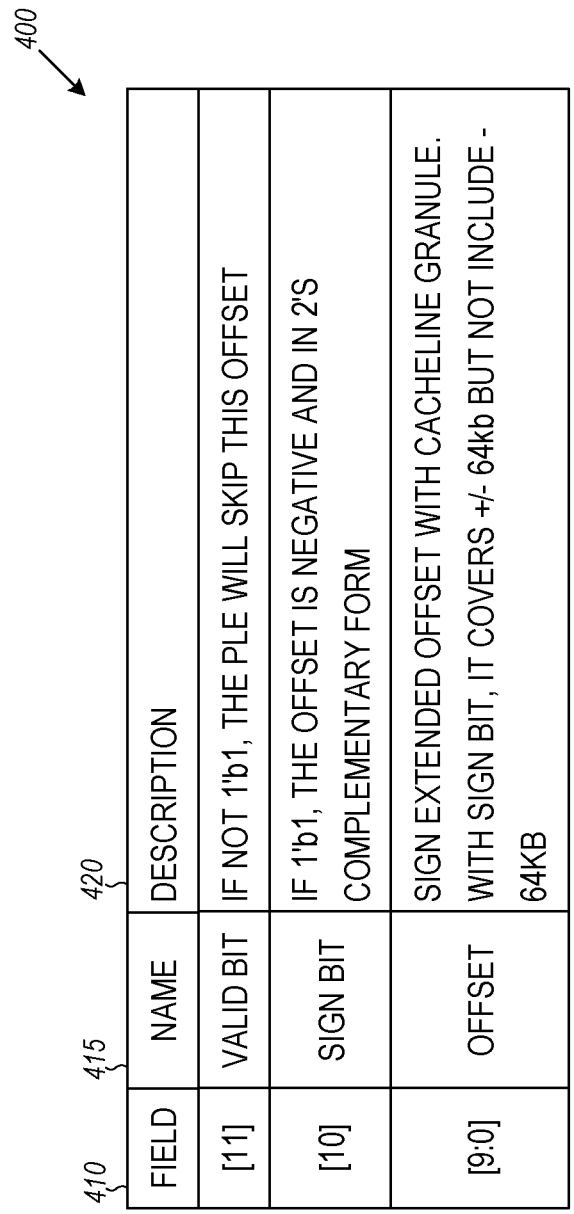
FIG. 4 is a software view of a definition of the offset field of the preload offset table according to an example embodiment.

FIG. 4 is a software view of a definition of the offset field indicated generally at 400, indicating a field 410, name 415, and description 420. The names 415 include a valid bit in field [11], a sign bit in field [10], and the offset in field [9 to 0]. The description indicates actions to be taken or not taken depending on the field values.

Programming of the preload offset table may be done using, for example, a move data to a register command MSR to PLE_OFFSET_TABLE_REGISTER register: MSR <PLE_OFFSET_TABLE_REGISTER>, Xt, where Xt is the source register. In general, a system register write may be used to program the preload offset table by writing a specific value in a register comprising the preload offset table. <PLE_OFFSET_TABLE_REGISTER> (POTR) is the destination. Once this register is written, based on the content of this register, a POT programming will be performed in the hardware. Xt is the source register of the data which will be written to POT. Note that programming of the preload offset table may be done via software without modifying the hardware. This ability to program the preload offset table may provide great flexibility and performance improvements for existing applications that may be modified, and for new applications.

In one embodiment, the 64-bit PLE_OFFSET_TABLE_REGISTER register is organized as illustrated at 500 in FIG. 5. The register 500 includes a field 510, name 515, reset 520, read write (RW) 525, and description 530. Field bits 63 to 57 are reserved. Bits 56 to 52 are a preload offset table index, which provides the index to the preload offset table. Bits 51-48 are the address offset of each entry. Bits 47-36, 35-24, 23-12, and 11-0 correspond to offsets 3, 2, 1, and 0 respectively. The offsets are from the starting address.

Note that the preload offset table can be programmed at any exception level. If the preload offset table programming crosses an index boundary, the crossed portion may be dropped. Before and after POT programming ISB (instruction synchronization barrier) and DSB (data synchronization barrier) instructions (ISB and DSB are ARM (advanced RISC (reduced instruction set computing) machine) instructions are specified for example only) are used as in the following example of preload offset table programming:

```
[Functional code]
ISB
DSB
MOV R1, <#IDX31_PTN_GRP0>
MSR <PLE_OFFSET_TABLE_REGISTER>, R1
...
MOV R1, <#IDX31_PTN_GRP3>
MSR <PLE_OFFSET_TABLE_REGISTER>, R1
ISB
DSB
[Functional code]
```

IDX31_PTN_GRP0 is an immediate value to be programmed to a first OFFSET location corresponding to the POT index and address offset in POTR. Once the preload offset table has been programmed, a bulk preload may be initiated by use of an ARM MSR, for example, to a specific register used to start the preload—<PLE_START_REGISTER> register. The command may take the form of: MSR <PLE_START_REGISTER>, Xt, where Xt is the source register. This register is a 64-bit register that contains the command and information suitable for triggering the preload engine.

FIG. 6 is a table 600 showing information associated with specific bits of the preload engine start register, including field 610, name 615, reset 620, RW 625, and description 630. Bit 63 is bit that defines whether or not the register is active, which can be set by MSR or updated directly by hardware. Bits 62-61 define prefetch for loads or stores to L1 and L2. Bits 60-51 provide the starting address the preload offset table. Bits 50-44 provide a prefetch amount corresponding to the number of prefetches to be triggered by the preload engine used by both a sequential bank preload (SBPL) and a pattern bulk preload (PBPL). Bits 43-1 are a virtual address base that is computed and used by a bulk preload. Bit 0 is currently reserved.

In one embodiment, software may query the preload engine status using a read from register, MRS instruction: MRS <Xt>, <PLE_STATUS>, to check bit 63. If 1, there is an active bulk preload that has remaining operations to be sent to a memory subsystem to obtain that data for the bulk preload. Note that this interface is best used for debugging and tuning purposes, as system performance may be affected if used during application execution by creating an instruction level dependency between a preload instruction and a functional program instruction.

Preload instruction completion means that all the preload operations required by the instruction have been sent to the memory subsystem and allocated into targeting cache. Software may query to make sure all the preload operations have been sent to the memory subsystem.

In some embodiments, a system register may be used to enable or disable the preload engine. When the preload engine is disabled, all accesses to the preload offset table register and preload start register will be trapped as undefined instructions. The preload engine and hardware preload cannot be enabled at the same time. When one of them is enabled the MSR instruction to enable the other one will be treated as write ignore (WI). An MSR to the preload start register with bit 63 set to 0 will stop all unsent preload engine preloads.

In one embodiment, the preload offset table may be represented as a finite state machine (FSM). FIG. 7 is a table 700 illustrating the states of the preload offset table FSM. The state is indicated in column 710, a reset column 715, and description is provided in column 720. IN a state [1:0], 0 is invalid, 1 is reserved, 2 is pending—the previous read has not sent all operations to the memory subsystem yet, and 3 is a ready state, meaning that the next preload offset table read may be received. A pending read counter [3:0] provides a count of the number of read operations to be sent in the pending read. A next index at [4:0] indicates a next index of the preload offset table to read.

Figure 8:
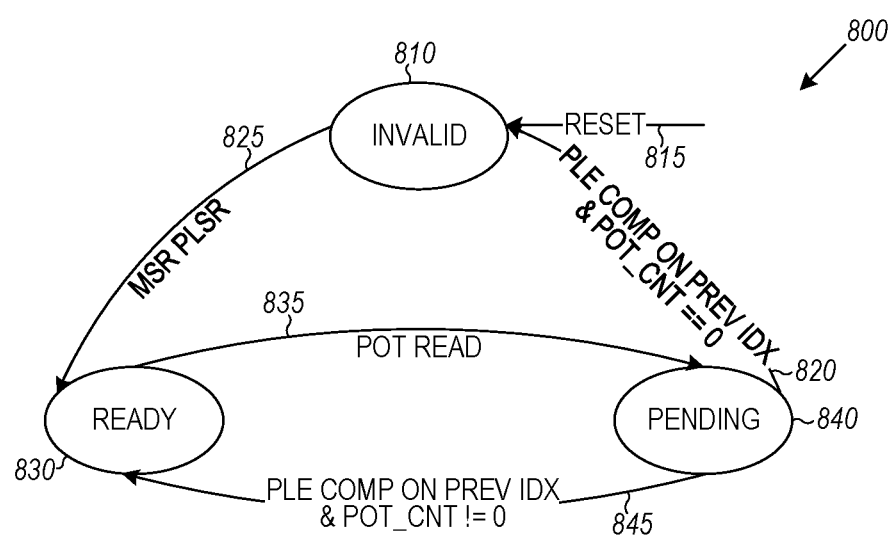
FIG. 8 is a graphic representation of a preload offset table finite state machine according to an example embodiment.

The FSM is indicated graphically at 800 in FIG. 8, with the invalid state indicated at 810 which may be entered via a reset 815 or an indication that no POT read is needed at 820. From the invalid state 810, a write to the preload start register at 825 moves the state to a ready state at 830. A preload offset table read at 835 moves the state into a pending state at 840. Upon completion of the operations for the read at 845, the state may move back to the read state at 830. POT_CNT represents the remaining times to read POT. POT_CNT==0 means all reads to POT have completed.

FIG. 9 is a table 900 describing states of a preload engine finite state machine. Table 900 includes a field column 910, a reset column 915, and a description column 920. The sates of the preload engine FSM includes 0, for invalid, meaning no preload offset table read is needed, 1, which is ready, where the PLE has valid requests to schedule, and 2 and 3, which are reserved.

OFF_PTR [3:0] is an offset register read pointer that provides the next offset to schedule. A counter, PLE_CNT [3:0] provides a counter for the remaining preload ending preloads within the same preload offset table index.

PLE BASE [48:6] is the virtual address of the current preload engine. OFFSET [15:0][11:0] is an offset register that stores up to 16 offset values.

Figure 10:
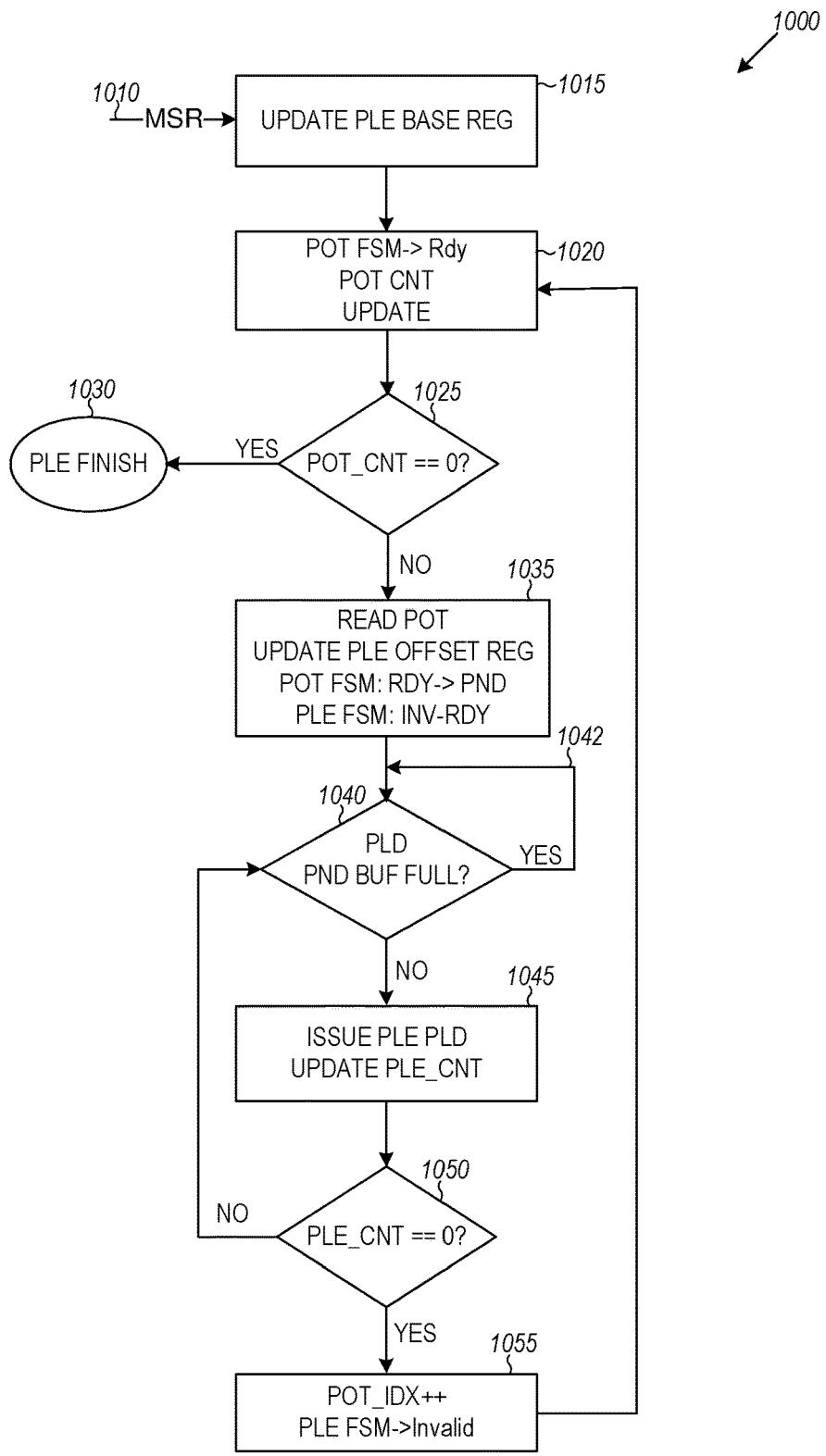
FIG. 10 is a flowchart illustrating a method of operation of the respective preload offset table and preload engine finite state machines according to an example embodiment.

FIG. 10 is a flowchart illustrating a method 1000 of operation of the respective preload offset table and preload engine finite state machines. Method 1000 begins when a write to register, MSR 1010 is performed to update the preload engine base register at 1015. This results in an update of the preload offset table counter 1020. A check is made to determine if the POT read counter is equal to 0 at 1025. If yes, the operation is completed and the preload engine is finished as indicated at 1030 and waiting for the next MSR 1010. If not, the preload offset table is read, preload engine offset register is updated, and the preload engine finite state machine is updated at 1035.

A check is then made at 1040 to determine if the preload pending buffer is full. If yes, a loop is performed as indicated at 1042 until the buffer is not full, upon which a preload engine preload is issued at 1045 and the preload engine counter is updated. A check is then made at 1050 to determine if the preload engine counter is equal to zero. If yes, the state is invalid as indicated at 1055 and the preload offset table counter is updated at 1020, and processing continues from there. If not, processing returns to decision block 1040 to determine if the preload pending buffer is full, and processing continues from there.

Figure 11:
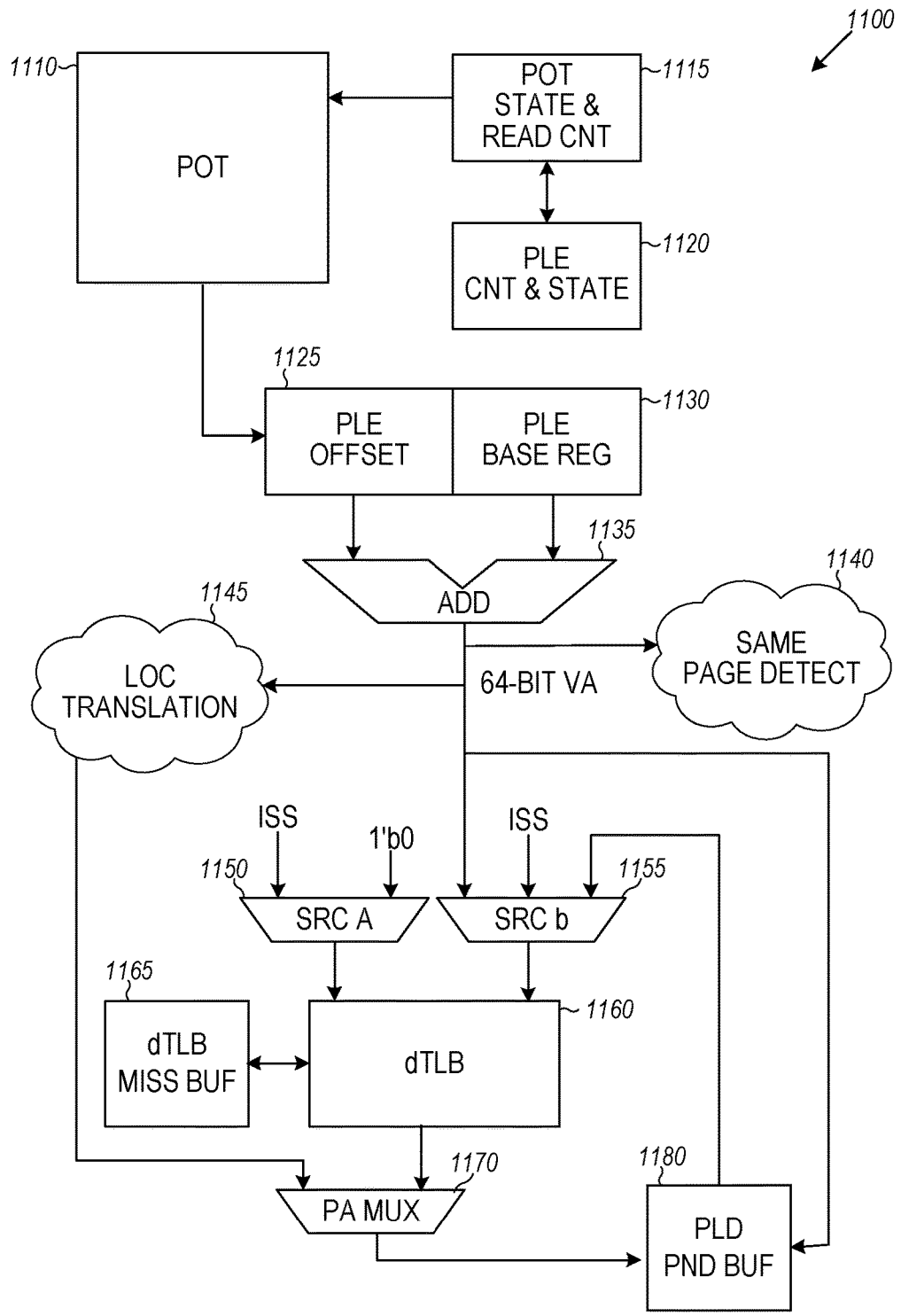
FIG. 11 is a block diagram of a life time of a preload engine preload according to an example embodiment.

FIG. 11 is a block diagram of a life time of a preload engine preload indicated generally at 1100. The preload offset table is indicated at 1110 and is coupled to receive state and read control from a block 1115, which receive preload engine control and state information from 1120. The preload offset table 1110 provides the preload engine offset 1125 and preload engine base register 1130 data comprising the virtual base address of the preload data. The virtual base address is then provided to an adder 1135 to form the virtual address of the preload data to be fetched.

If the address results in the same page being detected as indicated at 1140, the address may be translated locally as indicated at 1145. Otherwise, a pair of source registers 1150, SRC A and 1155, SRC B are used to provide information to a translation lookaside buffer 1160, which includes a translation lookaside miss buffer 1165, in a classic virtual address translation configuration. The translated address is provided to a physical address multiplexor 1170 along with the local translation 1145 for selection in providing to a preload pending buffer 1180 which provides addresses to the memory subsystem for loading in cachelines.

Once the preload offset table (POT) 1110 is programmed and preload start register (PLSR) is written, the hardware will read the corresponding POT entry and copy it to a bank of flops which contains at most 16 offset values. In the mean time Base Register is updated with VA base and POT counter is initiated by the following equation:

$$POT\_CNT = (PRF\_AMNT + POT\_OFFSET) \leq 16?4'b1$$

$$:ROUND\_UP(PRF\_AMNT/16)+1$$

where PRF_AMNT is the prefetch amount.

POT_STATE is initiated as READ_READY which generates a read op to POT and update the Offset Registers 1125 with 16 offset values and initiates PLE_STATE to PLE_ACTIVE and initiate the offset register read pointer to POT_OFFSET.

PLE adder 1135 then computes the VA address and sends it to source B 1155 of one of the dTLB 1160 while source A 1150 may be tied to 0, piggybacking on the dTLB side door interface. If conflicting with any demanding translation request or misses dTLB, it allocates into PLD Pending Buffer (PPB) 1180 with VA recorded. If translation is successful, it allocates in PPB with physical address (PA) recorded. An optimization here is that PLE always remembers the previous virtual to physical, VPN to PPN, page translation. If a subsequent PLE PLD hits on this page translation, as indicated at 1140, the translation will be provided via 1145 and not be injected to dTLB, saving bandwidth and power.

Once the physical address is known in the preload, the request scheduler in will pick it up and send to downstream with corresponding command type. Upon receiving Ack from downstream, the corresponding PLE PLD de-allocates from PPB. PLE prefetches require no level 1 data cache lookup regardless of PLE flavor.

Figure 12:
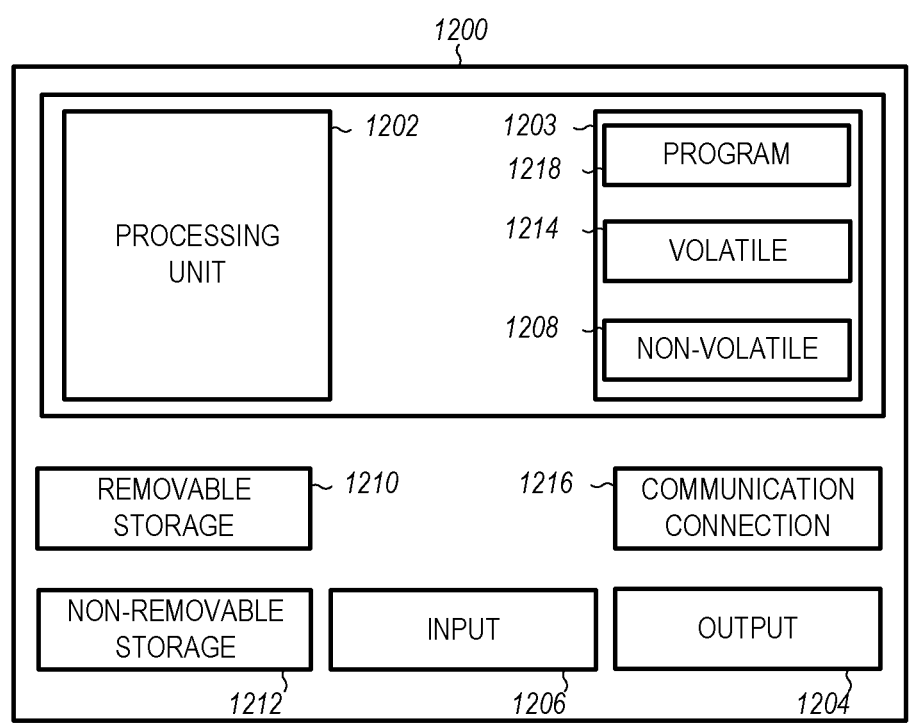
FIG. 12 is a block diagram illustrating circuitry for implementing a preload offset table and preload engine and performing methods according to example embodiments.

FIG. 12 is a block diagram illustrating circuitry for implementing a preload offset table and preload engine and performing methods according to example embodiments. All components need not be used in various embodiments. For example, mobile devices, laptop computers, desktop computers, servers, and network resources may each use a different set of components, or in the case of servers for example, larger storage devices.

One example computing device in the form of a computer 1200 may include a processing unit 1202, memory 1203, removable storage 1210, and non-removable storage 1212. Although the example computing device is illustrated and described as computer 1200, the computing device may be in different forms in different embodiments. For example, the computing device may instead be a smartphone, a tablet, smartwatch, or other computing device including the same or similar elements as illustrated and described with regard to FIG. 12. Devices, such as smartphones, tablets, and smartwatches, are generally collectively referred to as mobile devices or user equipment. Further, although the various data storage elements are illustrated as part of the computer 1200, the storage may also or alternatively include cloud-based storage accessible via a network, such as the Internet or server based storage.

Memory 1203 may include volatile memory 1214 and non-volatile memory 1208. Computer 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes input 1206, output 1204, and a communication connection 1216. Output 1204 may include a display device, such as a touchscreen, that also may serve as an input device. The input 1206 may include one or more of a touchscreen, touchpad, mouse, keyboard, camera, one or more device-specific buttons, one or more sensors integrated within or coupled via wired or wireless data connections to the computer 1200, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 1202 of the computer 1200. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 1220.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for a processing unit executing an application, the method comprising:
   determining, by the processing unit, that the application has reached a specific location and state;
   obtaining, by the processing unit, a trigger instruction responsive to determining the application has reached the specific location and state, wherein the trigger instruction includes an index into a preload engine offset table and a base address, wherein the preload engine offset table includes a plurality of distinct offsets associated with the base address;
   accessing a memory by a preload engine coupled to the processing unit to obtain the preload engine offset table based on the index and base address to determine the plurality of distinct offsets relative to the base address, the plurality of distinct offsets being specific to the application location and state; and
   prefetching data by the preload engine into a cache memory, for use by the processing unit executing the application, the data prefetched into the cache memory using addresses generated using the base address and each of the plurality of distinct offsets.

2. The method of claim 1, further comprising providing the base address and each of the plurality of distinct offsets to a preload engine.

3. The method of claim 2 wherein the base address and each of the plurality of distinct offsets are combined to form respective virtual addresses of the data.

4. The method of claim 3 and further comprising translating the virtual addresses of the data to respective physical addresses.

5. The method of claim 4 further comprising providing each of the respective physical addresses to a preload pending buffer.

6. The method of claim 5 and further comprising providing each of the respective physical addresses from the preload pending buffer to a memory subsystem to prefetch the data into the cache.

7. The method of claim 1 wherein the preload engine offset table comprises a finite state machine having states of invalid, pending, and ready.

8. The method of claim 7 wherein the pending state corresponds to operations for a prefetch not having been completed.

9. The method of claim 8 wherein the ready state corresponds to the operations for the prefetch having been completed and being ready for another prefetch.

10. A device comprising:
a processing unit;
a memory, coupled to the processing unit;
a preload offset table, stored in the memory and containing a plurality of entries, each entry including multiple distinct offsets, the preload offset table entries corresponding to access patterns of respective applications configured to be executed by the processing unit;
an adder coupled to the preload offset table and configured to add a selected base address, corresponding to one of the applications, to each of the multiple distinct offsets to form multiple virtual addresses of data to be prefetched to a cache memory;
a virtual address translator configured to translate the virtual addresses to respective physical addresses; and
a preload pending buffer configured to receive the respective physical addresses and to provide the respective physical addresses to the memory to configure the memory to provide the data to the cache for use by the processing unit executing the one application.

11. The device of claim 10 further comprising a same page detector configured to receive each of the virtual addresses from the adder, the same page detector being configured to bypass the virtual address translator responsive to a same page virtual address as previously translated having been received.

12. The device of claim 11 further comprising a local translator configured to receive the same page virtual address and to translate the same page virtual address directly for provision to the preload pending buffer, bypassing the virtual address translator.

13. The device of claim 10 and further comprising registers coupled to the preload offset table, the registers configured to provide a program location and a state of a program being executed by a processor to obtain an index into the preload offset table at a corresponding pattern.

14. The device of claim 10 wherein the preload offset table comprises a finite state machine having states of invalid, pending, and ready.

15. The device of claim 14 wherein the pending state corresponds to operations for a prefetch not having been completed and wherein the ready state corresponds to the operations for the prefetch having been completed and being ready for another prefetch.

16. A system comprising:
a processing unit;
a memory, coupled to the processing unit;
a pattern table stored in the memory and configured to provide a base address of a bulk preload as a function of a specific program location and state;
a preload offset table stored in the memory and indexed via the pattern table and configured to provide multiple entries corresponding to access patterns associated with the specific program location and state, each entry including multiple distinct offsets;
a preload engine coupled to the processing unit and configured to receive the base address and to receive the multiple distinct offsets from the preload offset table, and configured to derive multiple virtual addresses from the base address and the multiple distinct offsets, respectively, and to provide a translation of the multiple virtual addresses to multiple respective physical addresses;
a preload pending buffer stored in the memory and configured to receive the multiple physical addresses from the preload engine;
a cache memory configured to receive data located at the multiple physical addresses; and
the processing unit being configured to access the cache to obtain the data located at the multiple physical addresses.

17. The system of claim 16 wherein the preload offset table comprises entries containing at least 16 offsets.

18. The system of claim 16 wherein the base address provided by the pattern table includes a pattern base address, a structure size, and a user ID.

19. The system of claim 16 wherein the preload engine comprises a preload start register configured to receive a command and information sufficient to trigger the bulk preload, the information including a preload offset table starting address, a prefetch amount, and a virtual base address.

* * * * *